June 4, 1935.  A. C. GILBERT ET AL  2,003,829
MIXING APPARATUS
Filed Nov. 28, 1931  4 Sheets-Sheet 1

June 4, 1935.  A. C. GILBERT ET AL  2,003,829
MIXING APPARATUS
Filed Nov. 28, 1931  4 Sheets-Sheet 2

Inventors
Alfred C. Gilbert
and Arthur A. Arnold
By Rockwell & Bartholow
Attorneys

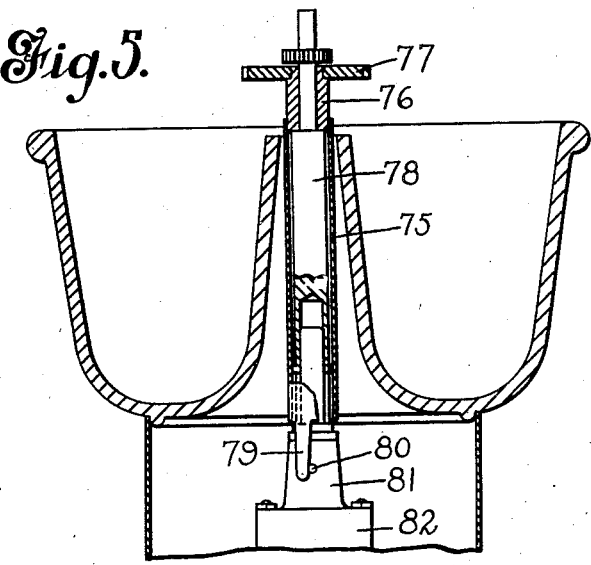
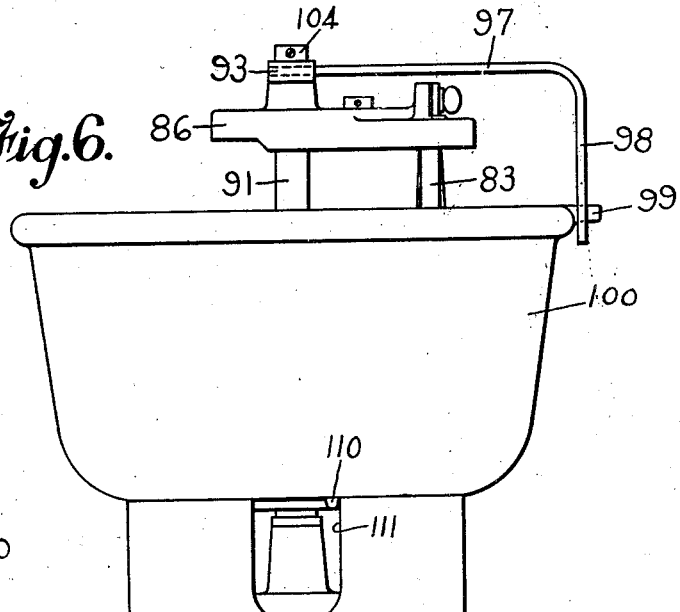
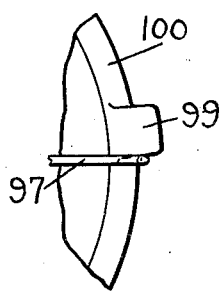

June 4, 1935.  A. C. GILBERT ET AL  2,003,829
MIXING APPARATUS
Filed Nov. 28, 1931  4 Sheets-Sheet 4
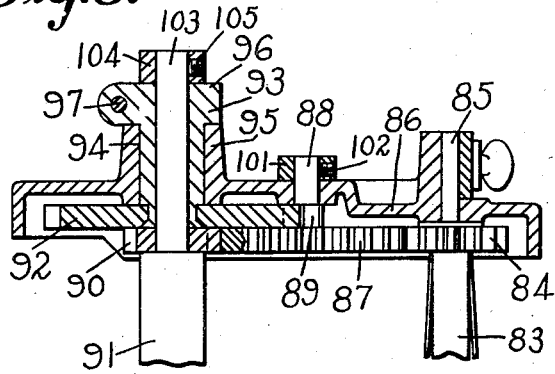
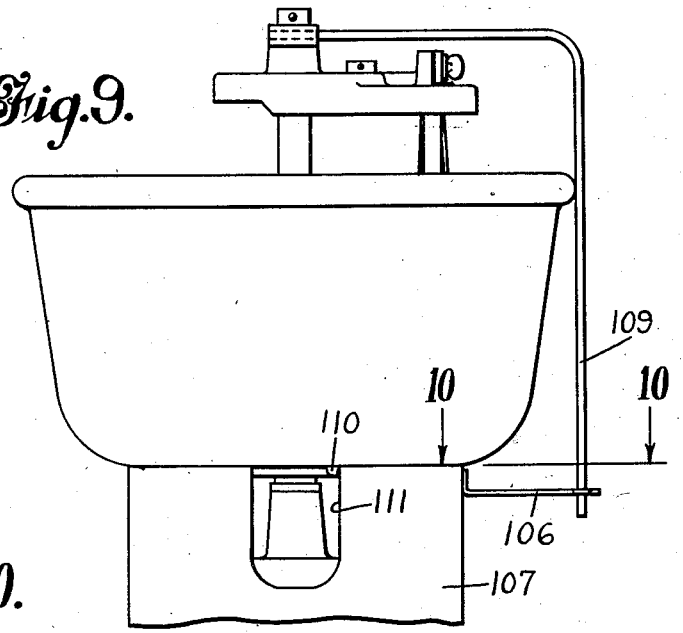
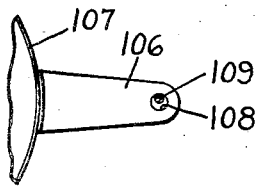
Inventors
Alfred C. Gilbert
and Arthur A. Arnold
By Rockwell & Bartholow
Attorneys Patented June 4, 1935

2,003,829

UNITED STATES PATENT OFFICE 2,003,829

MIXING APPARATUS

Alfred C. Gilbert, North Haven, and Arthur A. Arnold, New Haven, Conn., assignors to The A. C. Gilbert Company, New Haven, Conn., a corporation of Maryland Application November 28, 1931, Serial No. 577,754

12 Claims. (Cl. 259—102)

Our invention relates to a mixing apparatus and more especially to a portable mixing apparatus suitable for whipping cream, mixing cake batters, or stirring, mixing, or whipping other plastic or liquid materials.

One of the general objects of the invention is to bring about a form of mixing apparatus in which a rotatable stirring element is mounted for orbital movement in a receptacle to reach all parts of the material contained in the receptacle.

In a more specific aspect, the invention relates to a power driven mixer wherein a mixing bowl is mounted on a casing containing an electric motor, a stirring element being mounted to operate within the bowl and connected to the motor by mechanism extending upwardly through the bowl.

A feature of the invention resides in a simple form of power connection between the stirring element and the motor, wherein the former is rotated and moved through a predetermined orbital path in the bowl.

A further feature of the invention resides in a form of mixing apparatus wherein the bowl, bowl support, stirring element or elements, and driving connections therefor, may be readily separated for cleaning and other purposes.

To these and other ends, the invention consists in the novel features and combinations of parts to be hereinafter described and claimed.

In the drawings:

Fig. 5 is a cross-sectional view of a modification;

Fig. 6 is a front elevational view of another modification;

Fig. 7 is a fragmentary plan view of the modification shown in Fig. 6;

Fig. 8 is a cross-sectional view of a part of the driving connections of the modifications shown in Fig. 6;

Fig. 9 is a front elevational view of still another modification, and

Fig. 10 is a cross-sectional view along line 10—10 of Fig. 9.

Figure 1:
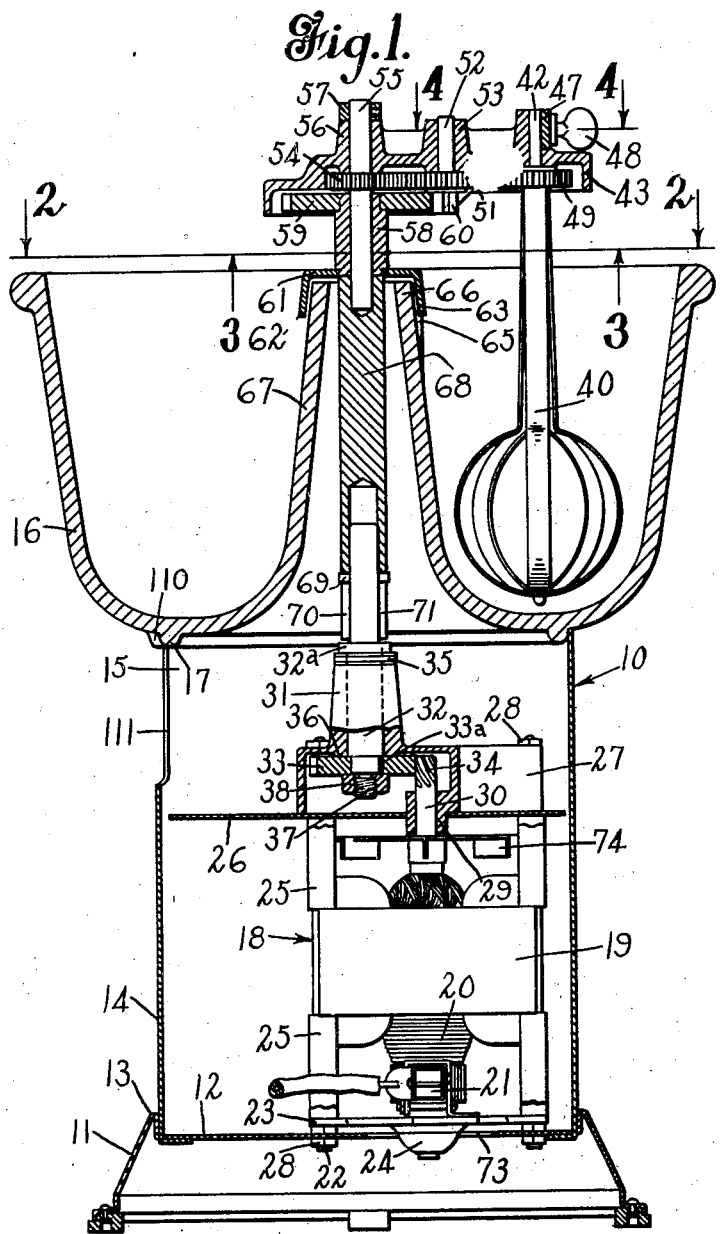
Fig. 1 is a front elevational view in section of a mixing apparatus according to our invention.

Referring to the drawings in which we have illustrated our invention by showing a preferred embodiment of the same, the reference numeral 10 indicates, in general, the improved mixing apparatus which includes a base 11, pressed out of sheet material and inwardly dished at its upper end to form a relatively flat face 12 and an annular flange-like rim portion 13, in which a cylindrical casing 14 is received, casing 14 being secured on face 12, and embraced by rim 13. On the upper end 15 of casing 14 is a mixing bowl 16, the latter being provided on its lower end with rib 17, received within the open end 15 of casing 14, and serving to position the bowl thereon.

The reference numeral 18 indicates, in general, an electric motor herein provided with a field magnet 19, an armature 20, and brushes 21, the motor 18 being secured to base 11 by means of threaded rods 22, which pass through base 11, arms 23 of lower bearing 24, spacers 25, field magnet 19, a disk-like plate 26, and reduction gearing case 27, the various parts through which the rods extend being clamped together by nuts 28, on the ends of rod 22. Gear casing 27 includes a bearing 29 for shaft 30, of motor 18, and an upwardly extending boss 31 in which a vertical shaft 32 is mounted, shaft 32 having a gear 33 on the lower end thereof, gear 33 meshing with gear 34 on the end of shaft 30. The end thrust in shaft 32 is taken up by a collar 32ª integrally formed with respect thereto, and resting on a ball-bearing 35 (not shown herein in detail), at the upper end of boss 31, the thrust in the opposite direction being taken up by contact of gear 33 with a face 36 at the lower end of boss 31. Gear 33 is secured on shaft 32 in any desired manner, herein, the lower end 37 of the shaft being provided with a key 33ª and being threaded for the reception of nut 38, which bears against the gear.

The reference numerals 39 and 40 indicate, in general, a pair of stirring elements mounted for rotation on shafts 41 and 42, extending upwardly through a gear housing 43, the latter having a rib 44 in which openings 45 and 46 for shafts 41 and 42 are provided, the shafts being secured against movement in openings 45 and 46 by means of plate 47 which is clamped against the shafts by thumb screw 48, extending through plate 47 and threaded in rib 44. On the upper ends of stirring elements 39 and 40 are gears 49 and 50, which are in mesh with one another, while gear 49 is in mesh with gear 51, having a spindle 52 rotatably mounted in boss 53 of gear housing 43, gear 51 being driven by gear 54, secured on shaft 55, the latter being supported in boss 56 of gear housing 43. Axial movement of shaft 55 is prevented by gear 54 which presses against one end of boss 56, and by the collar 57 secured on shaft 55 at the opposite end of boss 56.

On the lower end of shaft 55 is a sleeve 58, having a gear 59 secured on the upper end thereof, gear 59 being in mesh with a relatively small gear 60 formed on or secured to the underside of gear 51, the axes of gears 51 and 60 being in alignment. On the lower end of sleeve 58 a relatively flat plate 61 is secured, plate 61 having a disc-like central portion attached to sleeve 58 and a pair of radially and downwardly directed arms 62 and 63, which contact with ribs 64 and 65 on the upper end 66 of an inwardly dished conical portion 67 of bowl 16. The shaft 55 extends downwardly through sleeve 58 and on the lower end of shaft 55 an extension 68 is secured, extension 68 being bored at its lower end for reception on shaft 32, the latter being provided with a diametrically extending pin 69, the ends of which are received in slots 70 and 71 in the lower end of extension 68.

In operation, the motor 18 may be connected to any suitable source of power, the motor 18 through gears 33 and 34 rotating shaft 32 which, by means of the pin and slot connections 69, 70 and 71 causes the rotation of extension 68 and thus the rotation of shaft 55. As shaft 55 rotates, the gear 54 drives gears 49 and 50 through idler gear 51 and thus brings about the rotation of stirring elements 39 and 40. Rotation of gear 51 produces rotation of gear 60 and since the latter is in mesh with stationary gear 59, the gear housing 43 will be caused to move around gear 59 and shaft 55 to produce an orbital movement of the stirring elements 39 and 40. The gear 59 is held against rotation through its connection with sleeve 58, and the connection of the latter to arms 62 and 63, which engage ribs 64 and 65 on the upper end of the conical inwardly dished portion 67 of stationary bowl 16.

When the mixing operation is completed, the stirring elements 39 and 40, together with the gear housing 43 and the gears mounted therein, as well as sleeve 58, plate 61 and shaft extension 68, may be readily withdrawn upwardly, whereupon the bowl 16 may be lifted from the upper end of casing 14. By loosening thumb screw 48, the shafts 41 and 42 may be readily moved out of openings 45 and 46 to separate the stirring elements from the gear housing 43, whereupon the stirring elements may be washed or otherwise cleansed.

In Fig. 5 of the drawings we have shown a modification in which a sleeve 75 is fixed on the lower end of hub 76 of gear 77, gear 77 corresponding to gear 59 of Fig. 1, sleeve 75 extending downwardly around shaft 78 and being provided on its lower end with a finger 79 which by engagement with a pin or screw 80 in boss 81, of gear housing 82, holds the gear 77 against rotation. The constructional details of this form are otherwise similar to that shown in Fig. 1.

In Figs. 6, 7 and 8 we have shown another modification in which the stirring element or elements 83 are driven by means of gear 84, mounted on shaft 85, fixed in gear housing 86, gear 84 being in mesh with idler gear 87 fixed on shaft 88, on which a gear 89 is likewise fixed, gear 87 being in mesh with gear 90 on the upper end of shaft 91, which corresponds to shaft 68 of Fig. 1. Gear 89 is in mesh with gear 92 fixed on the lower end of sleeve 93, extending upwardly through opening 94 in boss 95 of gear housing 86, sleeve 93 being enlarged at its upper end 96, the enlarged upper end 96 supporting a bent rod 97 which extends outwardly from the sleeve 93 and downwardly at 98 to engage a lug 99, on bowl 100, to hold the sleeve against rotation.

The operation of the gearing in this form will be readily understood, the stirring elements 83 being rotated by gear 90 acting through gears 87 and 84, while the stirring elements are carried around within the bowl by the action of gear 89 on stationary gear 92. Shaft 88 is held against axial movement in a downward direction by collar 101, which is fixed on the upper end of the shaft by set screw 102, while downward movement of the reduced upper end 103 of shaft 91 is prevented by collar 104 secured on the upper end of shaft 91 by set screw 105.

That form of the invention shown in Fig. 9 of the drawings is quite similar to that shown in Figs. 6, 7 and 8 except that the lug 99 of Figs. 6 and 7 is replaced by a bracket 106, fixed on the side of casing 107 and provided with an aperture 108 in which the lower end of rod 109 is received.

The bowls are held against rotation by means of integrally formed lugs 110 which extend downwardly into openings 111 in the casings 14 or 107.

In certain aspects, our invention may be used in connection with the juice extracting device shown in the patent of Alfred C. Gilbert for Orange juice extractor, No. 1,797,190 dated March 17, 1931, and the co-pending application of Alfred C. Gilbert for Fruit juice extractor, filed February 14, 1929, Serial No. 339,785. The latter especially shows a juice extractor having a base, casing, motor and reduction gear quite similar to that disclosed herein, and the bowl, stirring element and driving connections therefor of the present application may readily replace the bowls and extracting bulbs of the patent and co-pending application, thus increasing the usefulness of these devices.

Figure 2:
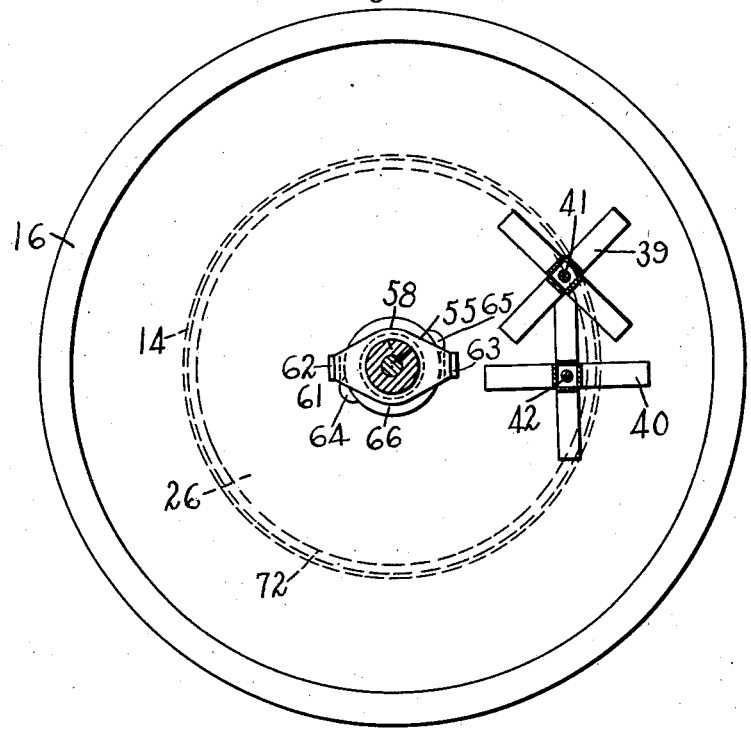
Fig. 2 is a cross-sectional view taken along line 2—2 of Fig. 1.
Figure 3:
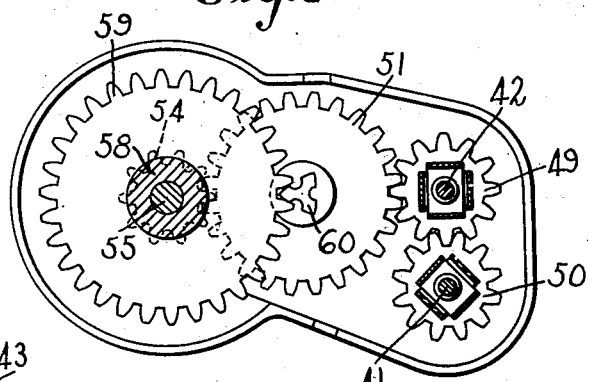
Fig. 3 is a cross-sectional view taken along line 3—3 of Fig. 1, but on an enlarged scale.
Figure 4:
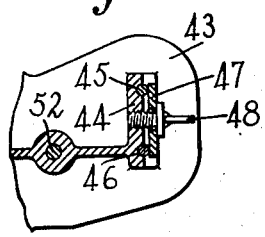
Fig. 4 is a cross-sectional view along line 4—4 of Fig. 1.

In the present application we are able to dispense with the usual motor casing, the disk 26 in cooperation with the casing 14 and the base 11 forming a casing in which the motor parts are enclosed. We prefer to space the edges 72 of the disk from the inner walls of the cylindrical casing 14, as shown in Figs. 1 and 2 of the drawings, so that a draft of air may pass upwardly through opening 73 in base 11, and upwardly between the disk 26 and casing 14, the draft of air being produced by a fan 74 mounted on motor shaft 38.

While we have shown and described preferred embodiments of our invention, it will be understood that it is not to be limited to the details shown but is capable of modification and variation within the spirit of the invention and the scope of the appended claims.

What we claim is:

1. In a material treating machine, a vertically disposed electric motor structure, relatively flat horizontal plates mounted one on either end of said motor structure and supported thereby, a casing connected to and extending upwardly from one of said plates and beyond the other plate, said casing and plates substantially enclosing said motor structure, the upper plate being slightly spaced from the inner walls of the casing to permit the passage of air therebetween, a bowl on the upper end of said casing, a material treating element within said bowl, and means connected to said motor structure and extending upwardly through said bowl for driving said element.

2. In a material treating machine, a vertically disposed electric motor structure, relatively flat horizontal plates mounted one on either end of said motor structure, a casing connected to and extending upwardly from one of said plates and beyond the other plate, the periphery of the upper plate being spaced slightly from the inner walls of the casing to permit the passage of air therebetween, a fan on the motor shaft for forcing air upwardly through said space, a bowl on the upper end of said casing, a material treating element within said bowl, and means connected to said motor structure and extending upwardly through said bowl for driving said element.

3. In a mixing apparatus, a bowl, a driven shaft extending upwardly through said bowl, a gear housing, a shaft having one end journaled in said housing and the other end secured in and driven by said first named shaft, a sleeve mounted on said second named shaft between the ends thereof, means for holding said sleeve against rotation, a gear mounted on and driven by said second named shaft, a gear secured on said sleeve against rotation, a stirring element supported for rotation on said housing, and means for giving said stirring element a planetary motion in said bowl comprising a gear for said stirring element, a gear in mesh with the first named gear and the gear on said stirring element, and another gear driven thereby in mesh with the stationary gear.

4. In a mixing apparatus, a bowl, a driven shaft extending upwardly through said bowl, a stationary sleeve within said bowl having a gear secured thereon, said shaft having a part extending through and rotatably mounted in said sleeve, a stirring element in said bowl, and means for giving said stirring element a planetary motion comprising a gear on said shaft, a gear for the stirring element, an idler gear between said gears, a gear secured to and rotatable with said idler gear, said last mentioned gear meshing with the gear on the stationary sleeve.

5. In a mixing apparatus, a bowl, a drive shaft extending upwardly through said bowl, a stirring element in said bowl, and means for giving said stirring element a planetary movement in said bowl comprising a relatively large stationary gear, a smaller gear driven by the shaft, a gear for the stirring element, an idler gear between the smaller gear and the gear for the stirring element, and a relatively small gear driven by the idler gear and in mesh with the stationary gear.

6. In a mixing apparatus, a bowl, a drive shaft extending upwardly through said bowl, a stirring element in said bowl, and means for giving said stirring element a planetary motion in the bowl comprising a gear housing rotatably mounted on the upper end of said shaft, a relatively large stationary gear, a smaller gear mounted on and driven by said shaft, a gear for the stirring element rotatably mounted on said housing, an idler gear rotatably mounted on said housing and in mesh with the gear on said shaft and the gear for the stirring element, and a gear driven by said idler gear and meshing with the stationary gear.

7. In a mixing apparatus, a bowl, a drive shaft extending upwardly through said bowl, a stirring element in said bowl, and means for giving said stirring element a planetary motion in the bowl comprising a stationary sleeve through which the upper end of the drive shaft extends, a relatively large stationary gear mounted on said sleeve concentric with respect to the shaft, a gear housing journaled on the upper end of said shaft, a gear for the stirring element rotatably mounted on said housing, a gear mounted on said shaft and driven thereby, an idler gear rotatably mounted on said housing, and a relatively small gear driven by the idler gear and meshing with the stationary gear on the sleeve.

8. In a mixing apparatus, a bowl, a stationary part upon which said bowl is mounted, driving means extending into said bowl and including a gear, a pair of rotatable beating elements extending into said bowl, a support for said beating elements supported by said driving means, said beating elements having overlapping paths of rotation, gears on said support drivingly connecting said beating elements and gears drivingly connecting one of said elements to the gear on said driving means to provide for the rotation of the elements in opposite directions, and gearing driven by said driving means and coacting with said stationary part to rotate the beating elements about the bowl axis.

9. In a mixing apparatus having a bowl with a centrally located aperture, and a stirring element extending into the bowl, the combination of a self-supporting driving means for said stirring element comprising a motor below said bowl, a vertical shaft supported by and driven from said motor, said shaft having a reduced upper end, a second shaft telescopically received upon the reduced upper end of the first named shaft and driven thereby, a stirring element support rotatably positioned on the upper end of said second named shaft, said stirring element being rotatably mounted on said support, a sleeve on said second named shaft below said support, means for holding said sleeve against rotation, a stationary gear mounted on said sleeve, a gear mounted on said second named shaft above said sleeve, a gear for said stirring element, and gearing interconnecting the gear on said second named shaft and the gears on said stirring element and sleeve respectively.

10. In a material treating device, a vertically disposed electric motor, a vertically disposed casing about said motor, a shaft supported by, extending upwardly from and driven by said motor, a bowl detachably seated upon the upper end of said casing and having a central sleeve portion therein, another shaft supported by and detachably and drivingly connected to the upper end of said first-mentioned shaft and extending upwardly through said bowl by way of said sleeve portion to a point substantially above the upper edge of the bowl, a beater support adapted to swing in a horizontal plane about an axis coincident with the bowl axis, means for mounting said support detachably on said last-named shaft at the upper end thereof at a point spaced substantially above the bowl rim, a pair of beaters having overlapping paths of rotation mounted on said support and depending into the bowl, and means associated with said support for effecting rotation of said beaters about their axes at high speed and orbital movement of the beaters in the bowl at relatively low speed.

11. In household mixing apparatus, the combination of a bowl having an upwardly extending sleeve portion therein, a driven shaft structure extending upwardly through said bowl by way of said sleeve portion and extending upwardly above said sleeve portion to a substantial extent, a substantially radially extending support mounted on the upper end portion of said shaft structure and supported from beneath by said shaft structure independently of the bowl and spaced substantially above the upper end of the bowl sleeve portion, said support being freely detachable with a portion of said shaft structure, which portion is located above the upper end of said bowl sleeve portion, a beater detachably mounted in the outer portion of said support and depending into the bowl, gearing associated with said support for effecting the drive of said beater at an increased speed relatively to the shaft structure, and means cooperating with said gearing and including an element detachably interengaged with the upper end of said bowl sleeve portion for causing orbital movement of said beater in said bowl.

12. In household mixing apparatus, the combination of a bowl having a substantially central upwardly extending sleeve portion, a driven shaft structure located within said sleeve portion and extending to a point substantially above the upper end of the latter, a support supported on and by said shaft structure independently of said bowl and spaced upwardly from the upper end of said sleeve portion, a pair of beaters having overlapping paths of rotation, depending into said bowl from the outer end portion of said support, said support being freely detachable with a portion of said shaft structure having a detachable connecting joint with another portion of the shaft structure located adjacent the upper end of said sleeve portion, means associated with said beaters for securing them detachably to said support, means mounted on said support for effecting rotation of said beaters about their respective axes, and means located beneath said last-named means and including a gear spaced substantially above the upper end of said sleeve portion for effecting rotation of said support about the shaft axis, said last-named means also including a member having non-rotative engagement with the upper end of said sleeve portion.

ALFRED C. GILBERT.
ARTHUR A. ARNOLD.